United States Patent
Hwang et al.

(10) Patent No.: US 11,876,590 B2
(45) Date of Patent: Jan. 16, 2024

(54) BEAM SEARCHING METHOD, COMPUTER PROGRAM, AND BEAM SEARCHING DEVICE USING ACTIVE PHASED ARRAY ANTENNA

(71) Applicant: AGENCY FOR DEFENSE DEVELOPMENT, Daejeon (KR)

(72) Inventors: Chanho Hwang, Daejeon (KR); Taehwan Joo, Daejeon (KR); Kichul Kim, Daejeon (KR); Kilsoo Jeong, Daejeon (KR); Daehoon Kwon, Daejeon (KR); Jongwoo Seo, Daejeon (KR); Jaesoo Jeong, Daejeon (KR); Youngdam Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 3 days.

(21) Appl. No.: 17/713,660

(22) Filed: Apr. 5, 2022

(65) Prior Publication Data
US 2022/0321190 A1    Oct. 6, 2022

(30) Foreign Application Priority Data
Apr. 5, 2021 (KR) ......... 10-2021-0044307

(51) Int. Cl.
*H04B 7/06* (2006.01)

(52) U.S. Cl.
CPC ......... *H04B 7/0634* (2013.01); *H04B 7/0626* (2013.01); *H04B 7/0639* (2013.01); *H04B 7/0691* (2013.01)

(58) Field of Classification Search
CPC ................................................. H04B 7/0634
(Continued)

(56) References Cited

U.S. PATENT DOCUMENTS 7,522,095 B1 *  4/2009  Wasiewicz ............. H01Q 21/20
                                                        343/705
8,559,542 B2   10/2013  Rietman et al.
(Continued)

FOREIGN PATENT DOCUMENTS

KR    10-1513846        4/2015
KR    10-2018-0087160   8/2018
KR    10-2127751        6/2020

OTHER PUBLICATIONS

Chan-Ho Hwang, et al., "Fast digital multi-beam search method for active phased array antenna system with full azimuth beam steering", Journal of Electromagnetic Waves and Applications, Sep. 16, 2021.

(Continued)

*Primary Examiner* — Lihong Yu
(74) *Attorney, Agent, or Firm* — Ladas & Parry, LLP (57) ABSTRACT

A beam search method using an active phased array antenna, in which the beam search method uses a single tile-type phased array antenna including a plurality of radiating elements arranged in a matrix form, and the phased array antenna includes a plurality of sub-arrays including the plurality of radiating elements and arranged in one direction, includes: calculating a beam coefficient application vector for each of the sub-arrays by using a received signal for each of the sub-arrays and a beam coefficient for each of the sub-arrays; determining, as an initial value, a beam coefficient of an effective sub-array corresponding to a maximum value from among absolute values of beam coefficient application vectors for each of the sub-arrays; and performing a monopulse algorithm based on the initial value, to obtain an extended beamwidth greater than a reference beamwidth, which is a range of a beam detected by the phased array antenna.

15 Claims, 8 Drawing Sheets

(58) Field of Classification Search
USPC .......................................................... 375/262
See application file for complete search history.

(56) References Cited

U.S. PATENT DOCUMENTS

| | | |
|---|---|---|
| 10,263,679 B2 | 4/2019 | Kim et al. |
| 2006/0148525 A1* | 7/2006 | Moon .................... H01Q 1/246 |
| | | 455/562.1 |
| 2011/0109495 A1 | 5/2011 | Takeya et al. |

OTHER PUBLICATIONS

Office Action dated Jul. 13, 2022 for Korean Patent Application No. 10-2021-0044307 and its English translation by Google Translate.
Seok Gon Lee: "Design of an Active Phased Array Antenna Having Multiple Monopulse Beams", Department of Radio Science and Engineering Graduate School of Chungbuk National University, Cheongju City, Republic of Korea, Feb. 2016, pp. 1-135.

* cited by examiner

BEAM SEARCHING METHOD, COMPUTER PROGRAM, AND BEAM SEARCHING DEVICE USING ACTIVE PHASED ARRAY ANTENNA

CROSS-REFERENCE TO RELATED APPLICATION

This application is based on and claims priority under 35 U.S.C. § 119 to Korean Patent Application No. 10-2021-0044307, filed on Apr. 5, 2021, in the Korean Intellectual Property Office, the disclosure of which is incorporated by reference herein in its entirety.

BACKGROUND

1. Field

One or more embodiments relate to a beam search method using an active phased array antenna, a computer program, and a beam search device, and more particularly, to a beam search method using overlapping of elements in a sub-array of the antenna and a device therefor.

2. Description of the Related Art

In a situation where the importance of building a network-centric operational environment (NCOE) is emerging recently, development of a public relay network that may overcome terrain obstacles, operate complementary to ground/satellite communication systems, and quickly establish an information communication infrastructure is required as a solution. For such a public relay network, an n (mission aircraft):1 (repeater) network needs to be established.

In an existing public communication network, a 1:1 communication network was constructed using a single directional antenna on a single terrestrial body. At this time, when a mechanical driving antenna is used, the size and weight of the mount may increase depending on a driving unit, and in order to operate several unmanned air vehicles (UAV) simultaneously, the number of transceiver antennas increases in proportion to the number of mission aircraft.

In addition, an existing phased array antenna for communication is developed as a system to support satellite communication, so there is a limit to omni-directional communication, and it is difficult to support communication between 3 or more manned/unmanned aerial vehicles. To overcome this, a polygonal phased array antenna system consistings of a plurality of flat array-shaped tiles is required, and in particular, to support manned/unmanned communication of four or more units, each tile requires independent beam search within a tile-by-tile beam steering range.

SUMMARY

One or more embodiments include a beam search method using an active phased array antenna capable of precise omnidirectional beam search using a single tile-type phased array antenna capable of independent beam search, and a device therefor.

Additional aspects will be set forth in part in the description which follows and, in part, will be apparent from the description, or may be learned by practice of the presented embodiments of the disclosure.

According to one or more embodiments, a beam search method using an active phased array antenna, in which the beam search method uses a single tile-type phased array antenna including a plurality of radiating elements arranged in a matrix form, and the phased array antenna includes a plurality of sub-arrays including the plurality of radiating elements and arranged in one direction, includes: calculating a beam coefficient application vector for each of the sub-arrays by using a received signal for each of the sub-arrays and a beam coefficient for each of the sub-arrays; determining, as an initial value, a beam coefficient of an effective sub-array corresponding to a maximum value from among absolute values of beam coefficient application vectors for each of the sub-arrays; and performing a monopulse algorithm based on the initial value to obtain an expanded beamwidth greater than a reference beamwidth, which is a range of a beam detected by the phased array antenna.

The monopulse algorithm may be performed on an effective sub-array corresponding to the initial value, and the performing of the monopulse algorithm to obtain the expanded beamwidth may include: determining a midpoint of the effective sub-array; and calculating a summation coefficient for radiating elements arranged on both sides of the midpoint, wherein the summation coefficient may include a first summation coefficient for a first radiating element group arranged on one side of the midpoint and a second summation coefficient for a second radiating element group arranged on the other side of the midpoint, and the effective sub-array may include an overlapping portion including overlapping elements used for both calculation of the first summation coefficient and calculation of the second summation coefficient.

The first summation coefficient may be calculated by including a beam coefficient applied value of a first overlapping element that is at least a part of the second radiating element group, and the second summation coefficient may be calculated by including a beam coefficient applied value of a second overlapping element that is at least a portion of the first radiating element group.

The performing of the monopulse algorithm to obtain the expanded beamwidth may include, after the calculating of the summation coefficient, calculating a ratio value by using a sum and difference of the first summation coefficient and the second summation coefficient, and obtaining the expanded beamwidth using a trigonometric function calculated based on the ratio value.

The calculating of the ratio value may include calculating a first arithmetic expression calculated as the sum of the first summation coefficient and the second summation coefficient, and a second arithmetic expression calculated as the difference between the first summation coefficient and the second summation coefficient; and calculating the ratio value as a ratio of the second arithmetic expression to the first arithmetic expression.

When the effective sub-array has a reference distance in a direction in which the radiating elements are arranged in the effective sub-array, as the number of the overlapping elements increases, the reference distance may decrease.

The reference distance and the expanded beamwidth may be in inverse proportion to each other.

The phased array antenna is a polygonal phased array antenna in which a plurality of single tiles are arranged in a polygonal structure, and may be able to search a 360-degree beam by using an expanded beamwidth of each of the plurality of single tiles.

The method according to the embodiments described above may be stored in a computer-readable storage medium in the form of a computer program to be executed using a computer.

According to one or more embodiments, a beam search device using an active phased array antenna, the beam search device using a single tile-type phased array antenna including a plurality of radiating elements arranged in a matrix form, wherein the phased array antenna includes a plurality of sub-arrays including the plurality of radiating elements and arranged in one direction, includes: a controller, wherein the controller calculates a beam coefficient application vector for each of the sub-arrays by using a received signal for each of the sub-arrays and a beam coefficient for each of the sub-arrays, determines, as an initial value, a beam coefficient of an effective sub-array corresponding to a maximum value from among absolute values of beam coefficient application vectors for each of the sub-arrays, and performs a monopulse algorithm based on the initial value to obtain an expanded beamwidth greater than a reference beamwidth, which is a range of a beam detected by the phased array antenna.

The controller may perform the monopulse algorithm on an effective sub-array corresponding to the initial value, and in performing the monopulse algorithm, may determine a midpoint of the effective sub-array and calculate a summation coefficient for radiating elements arranged on both sides of the midpoint, wherein the summation coefficient may include a first summation coefficient for a first radiating element group arranged on one side of the midpoint and a second summation coefficient for a second radiating element group arranged on the other side of the midpoint, and the effective sub-array may include an overlapping portion including overlapping elements used for both calculation of the first summation coefficient and calculation of the second summation coefficient.

The first summation coefficient may be calculated by including a beam coefficient applied value of a first overlapping element that is at least a portion of the second radiating element group, and the second summation coefficient may be calculated by including a beam coefficient applied value of a second overlapping element that is at least a portion of the first radiating element group.

The controller, after the calculating of the summation coefficient, may calculate a ratio value using a sum and difference of the first summation coefficient and the second sum coefficient, and may obtain the expanded beamwidth by using a trigonometric function calculated based on the ratio value.

When calculating the ratio value, the controller may calculate a first arithmetic expression calculated as the sum of the first summation coefficient and the second summation coefficient, a second arithmetic expression calculated as the difference between the first summation coefficient and the second summation coefficient, and the ratio value as a ratio of the second arithmetic expression to the first arithmetic expression.

When the effective sub-array has a reference distance in a direction in which the radiating elements are arranged in the effective sub-array, as the number of the overlapping elements increases, the reference distance may decrease.

The reference distance and the expanded beamwidth may be in inverse proportion to each other.

The phased array antenna is a polygonal phased array antenna in which a plurality of single tiles are arranged in a polygonal structure, and may be able to search a 360-degree beam by using an expanded beamwidth of each of the plurality of single tiles.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the disclosure may have diverse modified embodiments, preferred embodiments are illustrated in the drawings and are described in the detailed description. Advantages and features of the embodiments, and implementation methods thereof will be clarified through following embodiments described with reference to the accompanying drawings. The disclosure may, however, be embodied in many different forms and should not be construed as limited to the embodiments set forth herein.

Reference will now be made in detail to embodiments, examples of which are illustrated in the accompanying drawings, wherein like reference numerals refer to like elements throughout, and repeated description thereof will be omitted.

It will be understood that although the terms "first," "second," etc. may be used herein to describe various components, these components should not be limited by these terms. An expression used in the singular encompasses the expression of the plural, unless it has a clearly different meaning in the context. It will be further understood that the terms "comprises" and/or "comprising" used herein specify the presence of stated features or elements, but do not preclude the presence or addition of one or more other features or elements. Sizes of elements in the drawings may be exaggerated for convenience of explanation. In other words, since sizes and thicknesses of components in the drawings are arbitrarily illustrated for convenience of description, the following embodiments are not limited thereto.

It will be understood that when a layer, region, or component is connected to another portion, the layer, region, or component may be directly connected to the portion or an intervening layer, region, or component may exist, such that the layer, region, or component may be indirectly connected to the portion. For example, when a layer, region, or component is electrically connected to another portion, the layer, region, or component may be directly electrically connected to the portion or may be indirectly connected to the portion through another layer, region, or component.

In the present invention, an expanded beamwidth means a beam search range greater than reference beam width.

Figure 1:
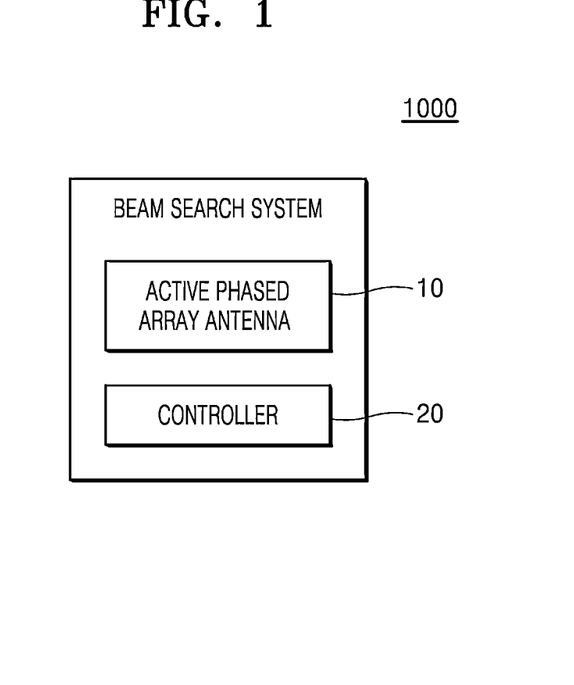
FIG. 1 is a view schematically illustrating a configuration of a beam search system according to an embodiment.

FIG. 1 is a view schematically illustrating a configuration of a beam search system 1000 according to an embodiment.

The beam search system 1000 may include an active phased array antenna 10 (hereinafter, the phased array antenna 10 will be abbreviated and described.) and a controller 20.

The phased array antenna 10 of the disclosure may be an antenna having a polygonal structure in which a plurality of flat-type single tiles are arranged. In particular, in order to support manned/unmanned communication of multiple units, each single tile may independently perform beam search within a beam search range of the corresponding single tile. The configuration of the phased array antenna 10 of the disclosure will be described in more detail with reference to FIG. 2 to be described later below.

The controller 20 may control the overall operation of the beam search system 1000 of the disclosure. The controller 20 may include all kinds of devices capable of processing data, such as a processor. The 'processor' may refer to, for example, a data processing device embedded in hardware having a physically structured circuit to perform a function expressed as code or commands included in a program. The controller 20 may be configured to execute a received command according to program code stored in a recording device such as a memory (not shown). In this case, all types of data generated and processed by the phased array antenna 10 and the controller 20 may be temporarily or permanently stored in the memory (not shown).

The beam search system 1000 of the disclosure may apply different beam coefficients for each sub-array using a single tile-type phased array antenna, and may calculate an initial value based on a maximum value of a beam coefficient application vector to which the beam coefficient is applied for each sub-array. In addition, precise beam search in all directions is possible by performing a monopulse algorithm of the disclosure based on the initial value to obtain an expanded beamwidth greater than a reference beamwidth determined by a physical/mechanical element of a single tile.

FIG. 1 shows that the phased array antenna 10 and the controller 20 are separate components, but according to an embodiment, the controller 20 is a component embedded in the phased array antenna 10, and the two components 10 and 20 may be implemented as one device. In addition, although not shown in FIG. 1, it is understood that the beam search system 1000 of the disclosure may further include other components within a range in which a beam search method may be easily implemented.

Figure 2:
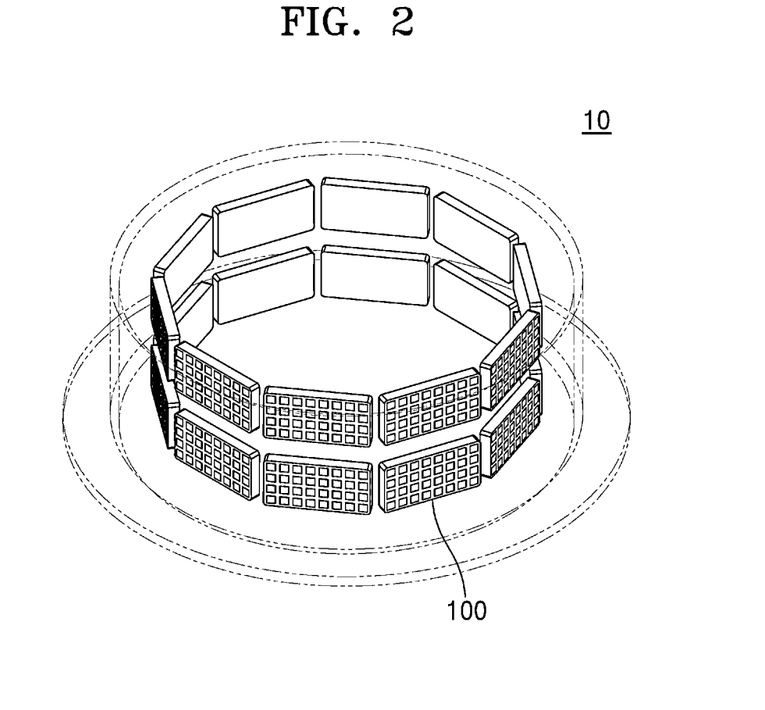
FIG. 2 is a view schematically illustrating a partial configuration of a phased array antenna according to an embodiment.

FIG. 2 is a view schematically illustrating a partial configuration of the phased array antenna 10 according to an embodiment;

The phased array antenna 10 may be a polygonal multi-beam antenna of a transmission/reception separation type including a plurality of single tile-type antennas 100. Hereinafter, a single tile antenna 100 may be simply referred to as a 'single tile 100'. The single tile 100 of the disclosure is a reception antenna, and a beam search method of the disclosure, which will be described later below, may be performed using a signal received by the single tile 100. The phased array antenna 10 may be a polygonal antenna in which a plurality of single tiles 100 are arranged in a polygonal structure. As shown in the drawing, one layer in which single tiles are arranged in a polygonal structure may be arranged above and below to form a plurality of layers. In the drawing, a polygonal structure in which two layers each with ten single tiles 100 are arranged is illustrated as an example. As will be described later below, it is possible to control beam search in all directions using only the single tile 100 having a certain reference beamwidth through polygonal arrangement of single tiles.

A specific configuration of each single tile 100 will be described in more detail with reference to FIG. 3 to be described later below.

Figure 3:
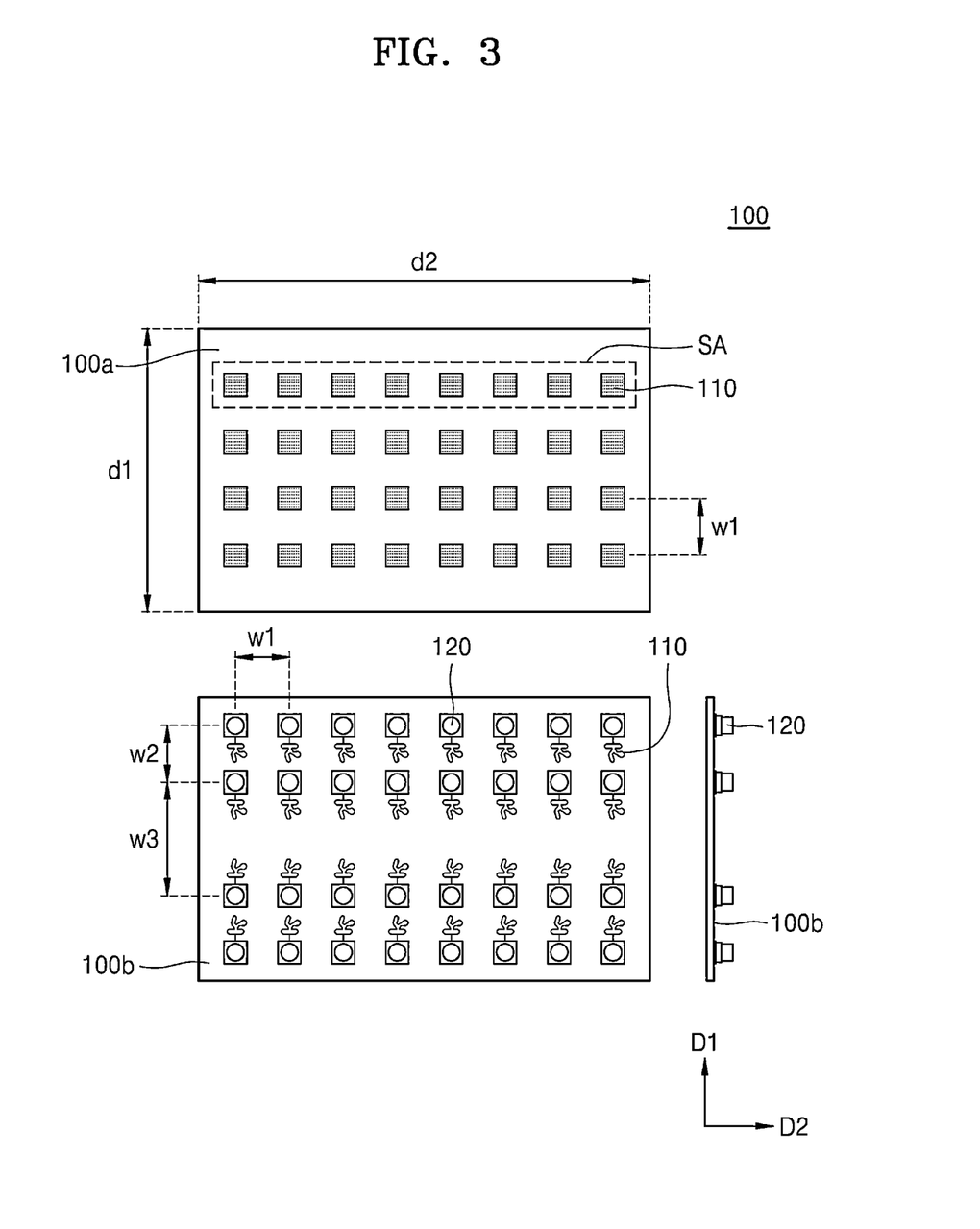
FIG. 3 is a view of front and rear surfaces of a single tile included in a phased array antenna according to an embodiment.

FIG. 3 is a view illustrating front and rear surfaces of the single tile 100 included in the phased array antenna 10 according to an embodiment. In the disclosure, a method of searching for an initial beam based on the single tile 100 constituting the phased array antenna 10 (see FIG. 2), and further, a method of searching for a beam in an expanded direction using the plurality of single tiles 100 may be provided.

The single tile 100 includes a front surface 100a and a rear surface 100b. Referring to the front surface 100a, the single tile 100 may include a plurality of radiating elements 110 arranged in a matrix form in a first direction D1 and a second direction D2. The single tile 100 may include a plurality of sub-arrays (SA) in the first direction D1, and each sub-array SA may include the plurality of radiating elements 110 in the second direction D2. In this case, on the front surface 100a of the single tile 100, the plurality of radiating elements 110 may be arranged at uniform intervals of a first width w1 in the first direction D1 and the second direction D2. For example, the first width w1 may be about 13 cm to about 14 cm. Hereinafter, a case in which the single tile 100 includes an 8×4 array of the radiating elements 110, that is, 32 radiating elements 110 will be described as an example. That is, the single tile 100 according to FIG. 3 may include four sub-arrays (SA) in the first direction D1, and each of the sub-arrays (SA) may include eight radiating elements 110 arranged at uniform intervals w1 in the second direction D2.

The single tile 100 may have a rectangular shape having a first length d1 in the first direction D1 and a second length d2 in the second direction D2 intersecting the first direction D1. For example, the first length d1 may be about 70 cm, and the second length d2 may be about 110 cm, but the size of the single tile 100 is not limited thereto.

Referring to the rear surface 100b, a radiating element 110 is shown at a position corresponding to the radiating elements 110 of the front surface 100a, and an SMP connector 120 is connected to each of the radiating elements 110 on the rear surface 100b. The radiating elements 110 may be uniformly apart from each other by the first width w1. The SMP connectors 120 may be apart from each other by the same first width w1 as the radiating elements 110 connected thereto, and may be apart from each other by a second width w2 or a third width w3 in the first direction D1. For example, the second width w2 may be about 14 cm, and the third width w3 may be about 30.8 cm, but the intervals between the radiating elements 110 is not limited thereto.

Figure 4:
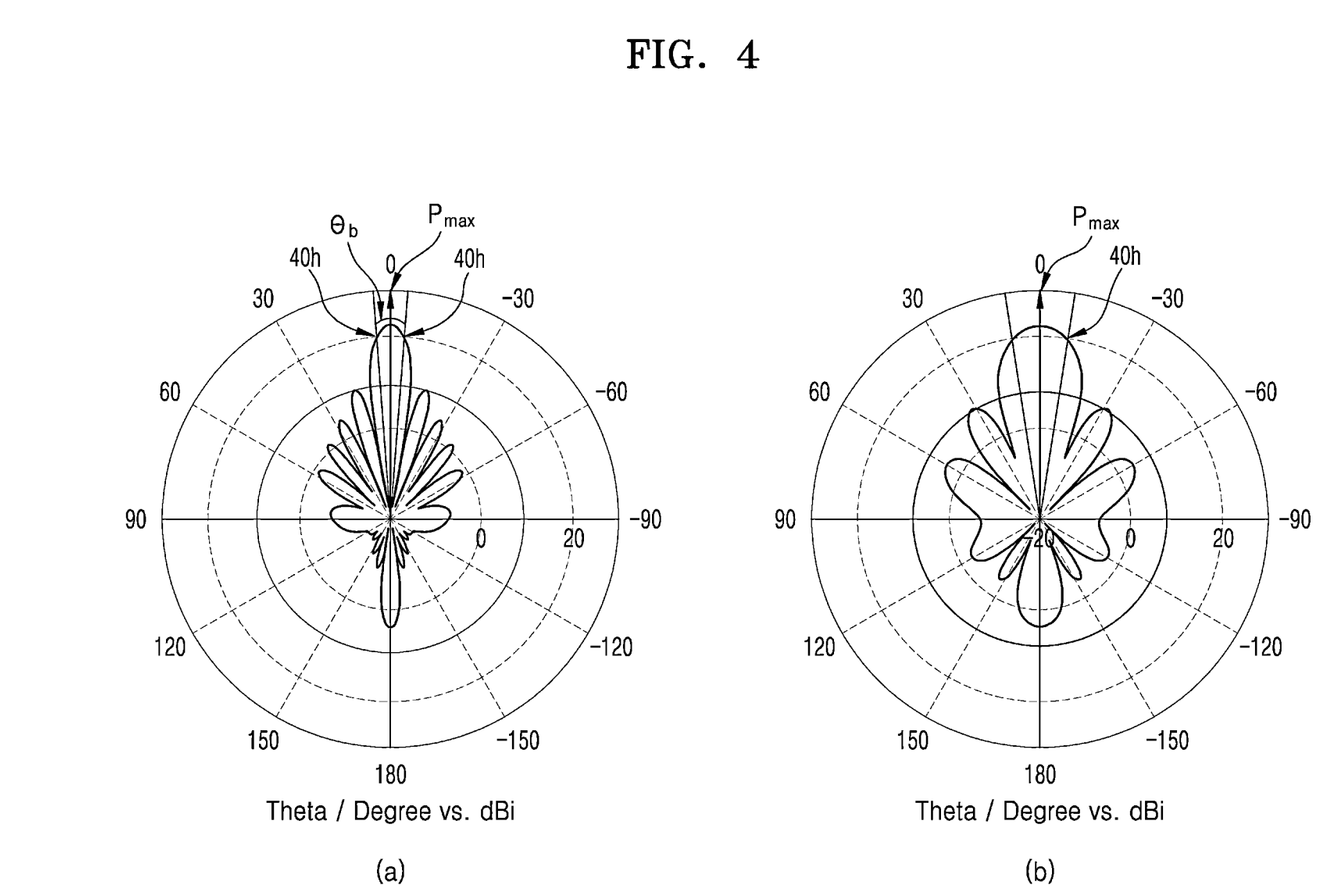
FIG. 4 is a view for explaining a radiation pattern of a single tile included in a phased array antenna according to an embodiment.

FIG. 4 is a view for explaining a radiation pattern of the single tile 100 included in the phased array antenna 10 according to an embodiment. FIG. 4 (a) shows a horizontal radiation pattern of the single tile 100, and FIG. 4 (b) shows a vertical radiation pattern of the single tile 100. The radiation pattern indicates the directionality of an antenna, and may include a main lobe near 0 degrees and other side lobes as shown in FIG. 4.

Hereinafter, a 'beam width' refers to an angle (a half power beam width) $\theta_b$ up to a point $40h$ t which power is reduced by half (10 log 0.5=−3 dB) based on power $P_{max}$ in a maximum beam direction of the main lobe. Hereinafter, $\theta_b$ is referred to as a "reference beamwidth", which is a width of an initial beam detectable by the corresponding single tile 100 from among signals received by one single tile 100, and may mean an effective beamwidth. A reference beamwidth of the single tile 100 may be determined based on the combination of intervals w1, w2, and w3 between the plurality of radiating elements 110 arranged in the single tile 100 and respective radiation patterns of the radiating elements 110. That is, the reference beamwidth of the single tile 100 may be a value determined by physical/mechanical factors of the single tile 100.

Referring to FIGS. 4 (a) and (b) together, an example in which a reference beamwidth of a reception type single tile 100 is about 9° is illustrated. Referring to the horizontal radiation pattern of FIG. 4 (a), it can be seen that a reference beam width $\theta_b$ is about 9°. However, the radiation pattern of FIG. 4 is only an example of a radiation pattern that the single tile 100 of the disclosure may have, and the disclosure is not limited thereto. Hereinafter, multi-beam forming of the single tile 100 in relation to the reference beamwidth will be described in more detail with reference to FIG. 5 to be described later below.

Figure 5:
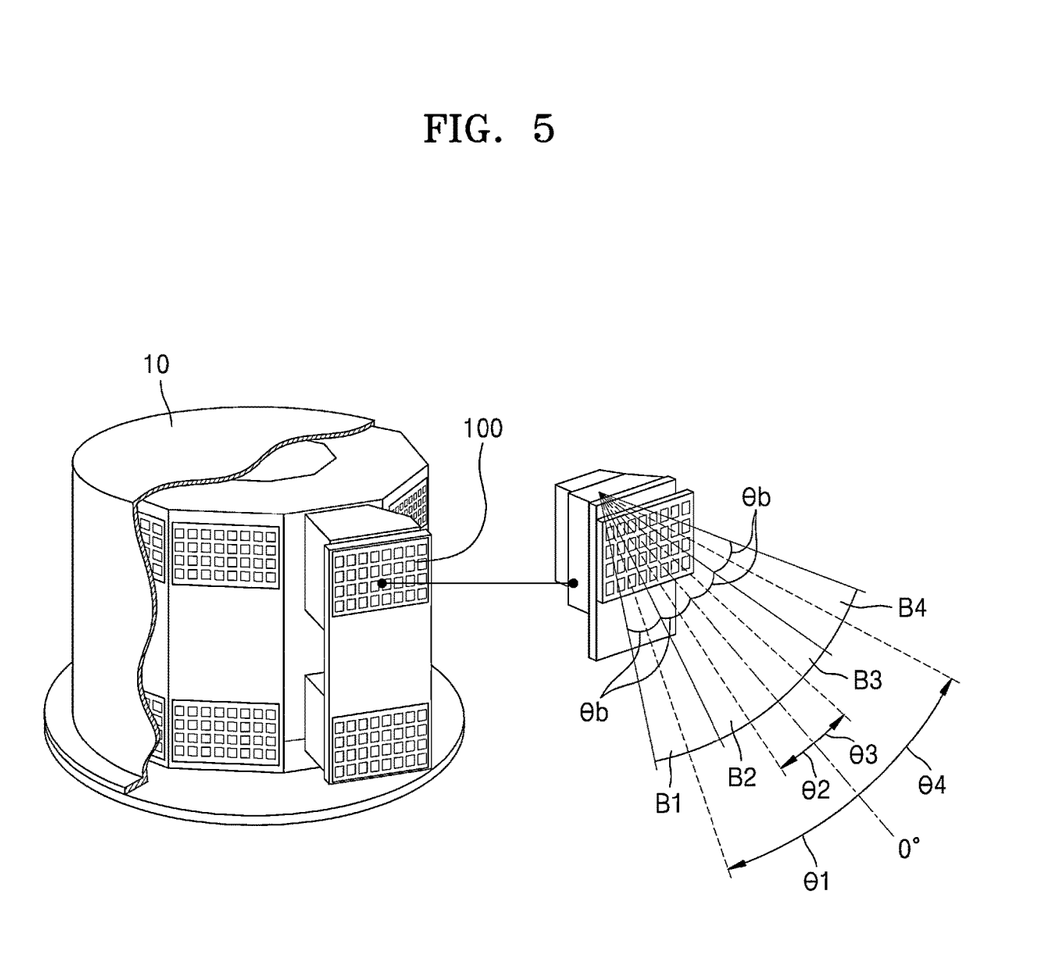
FIG. 5 is a view illustrating beam search using a beam search system according to an embodiment.

FIG. 5 is a schematic view of realizing beam search using the beam search system 1000 according to an embodiment.

The left side of FIG. 5 is the phased array antenna 10 including the plurality of single tiles 100, and the same content as the phased array antenna 10 described above in FIG. 2 may be applied. The right side of FIG. 5 is a view illustrating multidirectional digital beams B1 to B4 formed by applying a beam coefficient $\overline{w}_i$ for each sub-array SA to a reference beam width (e.g., about 9 degrees) of the single tile 100. At this time, the reference beam width $\theta_b$ of each of the digital beams B1 to B4 shown in FIG. 5 is the same, and when the beam coefficient $\overline{w}_i$ as a weight for each sub-array SA is applied to the reference beam width $\theta_b$, the digital beams B1 to B4 having different initial orientation angles may be generated. For example, respective directing angles $\theta 1, \theta 2, \theta 3$, and $\theta 4$ of the digital beams B1, B2, B3, and B4 may be as follows. For example, $\theta 1=\pm 13.5°, \theta 2=\pm 4.5°, \theta 3=-4.5°$, and $\theta 4=-13.5°$.

For example, when n single tiles 100 are arranged on one layer of the phased array antenna 10, in order to perform omnidirectional beam search using n single tiles 100, one single tile 100 needs to have a beam search range of 360/n (°). Referring to the example of FIG. 2 together, when ten single tiles 100 are arranged on one layer of the phased array antenna 10, in order to perform omnidirectional beam search, one single tile 100 needs to have a beam search range of 360°/10=36°. At this time, by applying different beam coefficients to each sub-array SA (see FIG. 3) using digital signal processing based on the reference beam width, as shown on the right side of the drawing, as many digital beams as the number of sub-arrays (SA) (see FIG. 3) included in the single tile 100 may be formed.

In more detail, using a beam search device and a method thereof according to an embodiment, the four digital beams B1, B2, B3, B4 having different directivity angles may be generated by applying different beam coefficients based on the reference beamwidth $\theta_b$, and the sum of respective reference beam widths $\theta_b$ of the digital beams B1 to B4 may be the same as the beam search range of the single tile 100 described above.

Thereafter, according to the disclosure, a beam steering angle may be precisely estimated by calculating reception intensity of the plurality of digital beams B1 to B4 and applying a monopulse algorithm to be described later below based on a beam coefficient in a direction in which the maximum value is calculated. In addition, a beam may be detected in an expanded beamwidth range that is expanded than the reference beamwidth in the reference of the single tile 100, and even when the single tile 100 is a polygonal phased array antenna arranged in a polygonal shape as shown in FIG. 2 or FIG. 5, precise beam search in all directions is possible.

Figure 6:
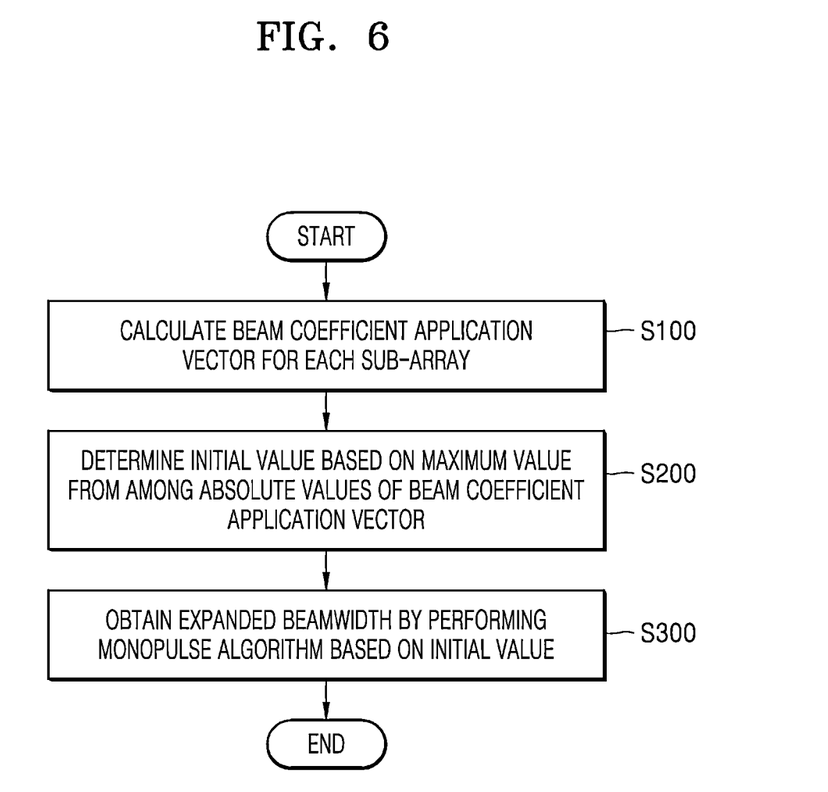
FIG. 6 is a flowchart illustrating a beam search method using an active phased array antenna according to an embodiment.

FIG. 6 is a flowchart illustrating a beam search method using an active phased array antenna according to an embodiment. The following operations may be performed by the controller 20 (see FIG. 1) of the beam search system 1000 described above.

First, in operation S100, a beam coefficient application vector for each sub-array SA is calculated using a received signal for each sub-array SA and a beam coefficient for each sub-array SA. It will be described in more detail with reference to FIG. 7 in relation to operation S100.

Figure 7:
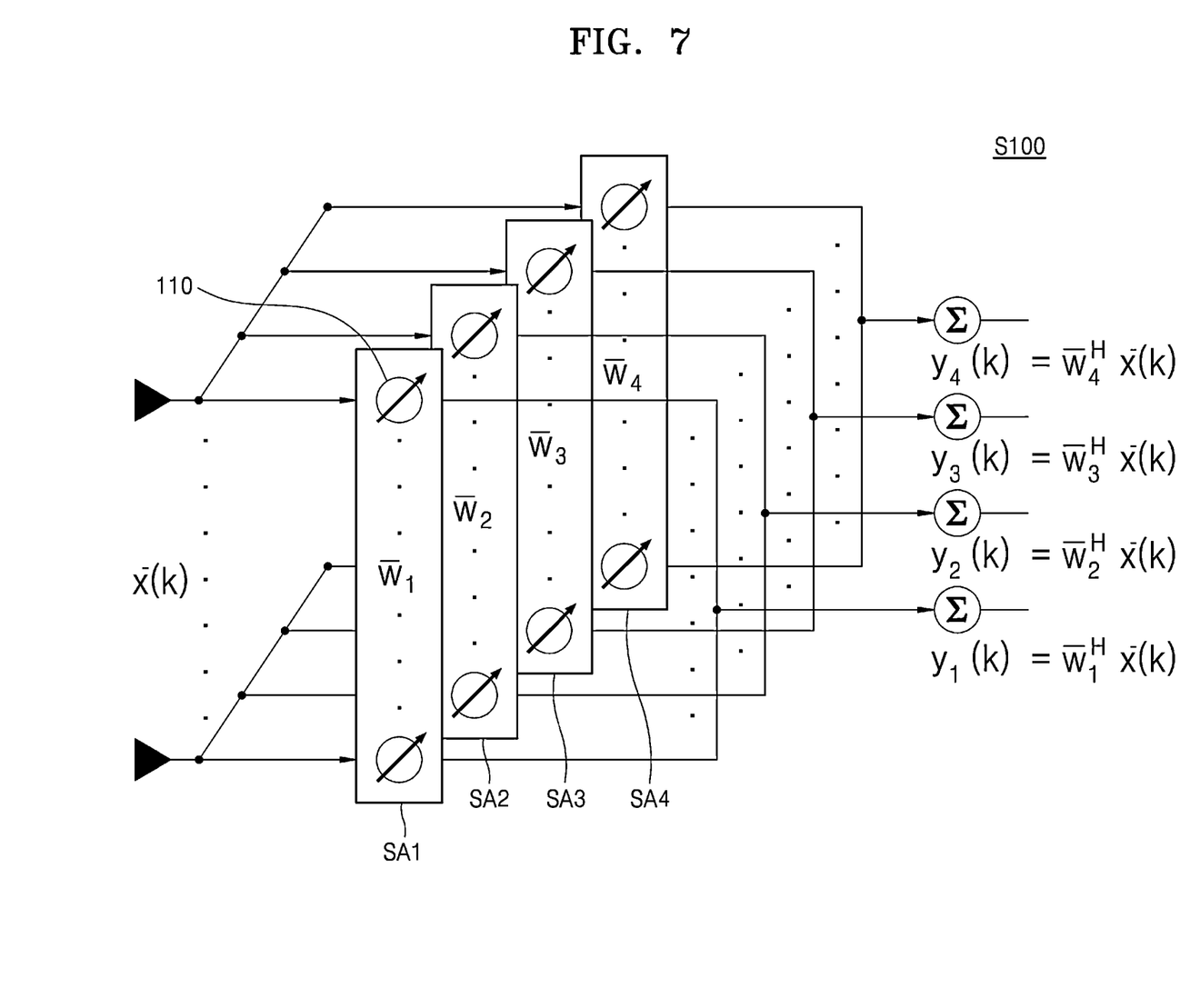
FIG. 7 is a view for explaining in more detail some operations of a beam search method using an active phased array antenna according to an embodiment.

FIG. 7 is a view for explaining in more detail operation S100 of calculating a beam coefficient application vector $y_n(k)$, which is a portion of a beam search method using an active phased array antenna according to an embodiment.

Referring to FIG. 7, four sub-arrays SA1, SA2, SA3, and SA4 (SA) included in one single tile are illustrated. In the drawing, the arrangement of the sub-arrays (SA) is three-dimensionally illustrated to show that a beam coefficient and a beam coefficient application vector are calculated in parallel for each sub-array SA. Operation S100 may include operations to be described later below.

First, as will be described later below, in operation S110, a beam coefficient $\overline{w}$ for each sub-array SA are determined (not shown).

A signal received in the single tile 100 shown in FIG. 7, after the four sub-arrays (SA) are phase-synchronized, may be synthesized with a received signal for eight radiating elements 110 arranged in the second direction D2 and converted into a discrete signal through an analog-to-digital converter. Assuming that it is a digital domain, it may correspond to a situation in which a signal is input to a linear array element. The disclosure may be applied in a narrow-band communication environment with a small-occupied bandwidth compared to a carrier wave.

A digital beam generated by each of the sub-arrays SA1 to SA4 may correspond to each of the digital beams B1 to B4 illustrated in FIG. 5. To each of the sub-arrays SA1 to SA4, the beam coefficient $\overline{w}$ as a weight distinct from each other may be applied and calculated in parallel. When a beam coefficient applied to an $i^{th}$ sub-array SAi is $\overline{w}_i$, the beam coefficient $\overline{w}_i$ may be expressed by Equation 1 below. In this case, $\lambda$ is a wavelength of an RF reception frequency reference, and d is a distance between the antenna radiating elements 110, and may correspond to the first width w1 shown in FIG. 3.

$$\overline{w}_i = \begin{bmatrix} e^{j\left(\frac{2\pi}{\lambda}\right)3.5d\sin\theta_i} \\ e^{j\left(\frac{2\pi}{\lambda}\right)2.5d\sin\theta_i} \\ e^{j\left(\frac{2\pi}{\lambda}\right)1.5d\sin\theta_i} \\ e^{j\left(\frac{2\pi}{\lambda}\right)0.5d\sin\theta_i} \\ e^{-j\left(\frac{2\pi}{\lambda}\right)0.5d\sin\theta_i} \\ e^{-j\left(\frac{2\pi}{\lambda}\right)1.5d\sin\theta_i} \\ e^{-j\left(\frac{2\pi}{\lambda}\right)2.5d\sin\theta_i} \\ e^{-j\left(\frac{2\pi}{\lambda}\right)3.5d\sin\theta_i} \end{bmatrix}$$ [Equation 1]

In this case, $\theta_i$ may be any one of $\theta_1$, $\theta_2$, $\theta_3$, and $\theta_4$ described above in FIG. 5. In the present specification, four sub-arrays (SA) included in the single tile 100, that is, four indices i will be described as an example. However, if the initial number of digital beams is to be changed, the disclosure may be applied in the same principle by changing numerical values of an index i and the corresponding angle $\theta_i$ and adding only a parallel operation.

For example, the beam coefficient $\overline{w}_1$ of the first sub-array SA1 may be calculated by substituting the aforementioned $\theta_1$ into $\theta_i$.

In operation S120, after calculating the beam coefficient $\overline{w}$ for each sub-array (SA) in this way, the beam coefficient application vector $y_n(k)$ for each sub-array SA may be calculated by multiplying a received signal x(k) for each sub-array SA and the beam coefficient $\overline{w}$ for each sub-array SA (not shown).

In more detail, the beam coefficient application vector $y_i(k)$ may be expressed as in Equation 2 below. In this case, $\overline{x}$ and k denote a received signal input to the sub-array SA and the number of discrete samples, respectively, i is an angle index, and in this embodiment has values of i=1, 2, 3, and 4.

$$y_i(k) = \overline{w}_j^H \overline{x}(k)$$ [Equation 2]

Thereafter, in operation S200, a beam coefficient of an effective sub-array ST corresponding to the maximum value from among absolute values of the beam coefficient application vector $y_i(k)$ for each sub-array SA is determined as an initial value. Operation S200 may be performed in operations to be described later below.

First, absolute values of the beam coefficient application vector $y_i(k)$ for each sub-array SA may be calculated to obtain a received signal strength $P_i$ for each sub-array SA. That is, the received signal strength may be calculated by summing absolute values of discrete signals expressed in complex numbers as shown in Equation 3 below.

$$P_i = \sum_{k=1}^{m}(|y_i(k)|)$$ [Equation 3]

Thereafter, a sub-array having a maximum value from among absolute values for each sub-array SA may be selected as the effective sub-array $S_T$, and a beam coefficient of the effective sub-array $S_T$ may be determined as an initial value $\overline{w}_0$. In other words, an initial direction in which an effective signal is received is determined based on the received signal strength calculated according to Equations 1 to 3. For example, when the received signal strength P1 of the first sub-array SA1 is a maximum value, the beam coefficient $\overline{w}_1$ of the first sub-array SA1 may be determined as the initial value $\overline{w}_0$.

Thereafter, in operation S300, by performing a monopulse algorithm according to the disclosure based on the initial value, it is possible to obtain an expanded beamwidth greater than a reference beamwidth, which is a range of a beam detected by the phased array antenna 10. Operation S300 will be described in more detail with reference to FIG. 8 to be described later below.

Figure 8:
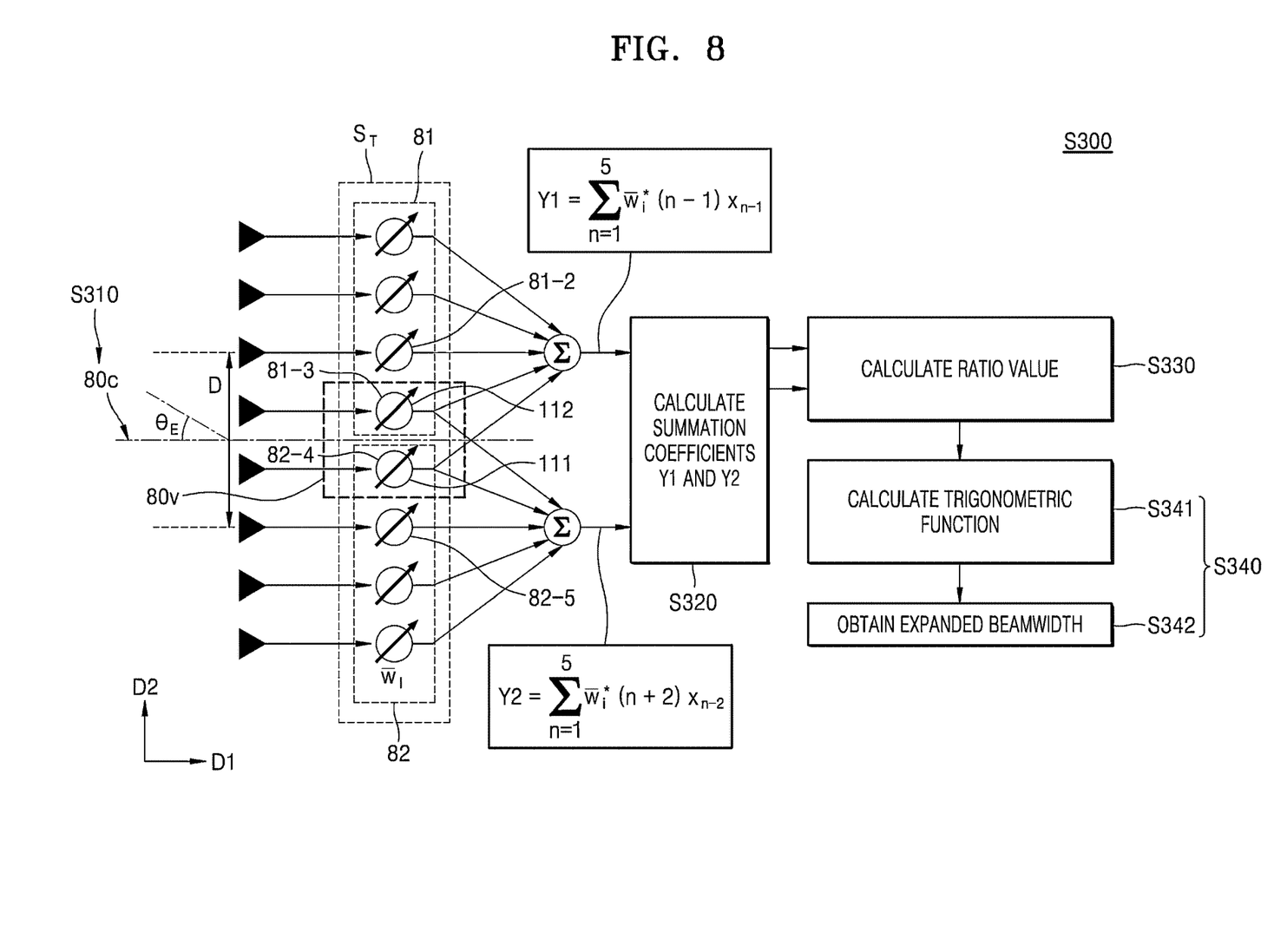
FIG. 8 is a view for explaining in more detail a monopulse algorithm according to an embodiment.

FIG. 8 is a view for explaining in more detail a monopulse algorithm according to an embodiment. Hereinafter, the monopulse algorithm may be performed on the effective sub-array ST corresponding to the initial value described above in FIG. 7. Operation S300 using the monopulse algorithm may include operations to be described later below, and operation S300 may also be performed by the controller 20 (see FIG. 1).

First, in operation S300, a midpoint 80c of the effective sub-array $S_T$ is determined. Referring to FIG. 8, Intermediate points divided by four from among eight radiating elements 110 arranged in the second direction D2 are illustrated as 80c.

Thereafter, in operation S320, summation coefficients Y1 and Y2 may be calculated for radiating elements arranged on both sides of the midpoint 80c. At this time, the summation coefficients Y1 and Y2 may include the first summation coefficient Y1 for a first radiating element group 81 arranged on one side of the midpoint 80c, and the second summation coefficient Y2 for a second radiating element group 82 arranged on the other side of the midpoint 80c. Each of the first and second summation coefficients Y1 and Y2 may be expressed by Equations 4 and 5 below. At this time, based on the direction of FIG. 8, each of the radiating elements 110 may correspond to index numbers 0 to 7 (i=0 to 7 and n=1 to 8) sequentially in a direction from the top to the bottom.

$$Y1 = \sum_{n=1}^{5} \overline{w}_i^*[n-1]x_{n-1}$$ [Equation 4]

$$Y2 = \sum_{n=1}^{5} \overline{w}_i^*[n+2]x_{n+2}$$ [Equation 5]

In this case, the effective sub-array $S_T$ for performing the monopulse algorithm may include an overlapping portion 80v including overlapping elements 111 and 112 used for both calculation of the first summation coefficient Y1 and calculation of the second summation coefficient Y2. In more detail, the first summation coefficient Y1 may be calculated by including a beam coefficient applied value of the first overlapping element 111 that is at least a portion of the second radiating element group 82 in addition to the first radiating element group 81. Similarly, the second summation coefficient Y2 may be calculated by including a beam coefficient applied value of the second overlapping element 112 that is at least a portion of the first radiating element group 81 in addition to the second radiating element group 82.

For example, referring to Equations 4 and 5 above, it can be seen that Y1 is calculated by summing application vectors of first to fifth (n=1 to 5) radiating elements (i=0 to 4) from the bottom, that is, the first radiating element group 81 and the first overlapping element 111, and Y2 is calculated by summing application vectors of third to seventh (n=1 to 5) radiating elements (i=3 to 7) from the bottom, that is, the second radiating element group 82 and the second overlapping element 112.

In other words, the number of radiating elements used to calculate each of the first summation coefficient Y1 and the second sum coefficient Y2 may exceed ½ of the number of radiating elements included in one sub-array SA.

In this case, the overlapping portion 80v may be determined by a reference distance D symmetrically extending from the midpoint 80c. In addition, the reference distance D is an interval between each of the radiating element group 81 and 82 and a physical center position within a group summing the respectively corresponding overlapping elements 111 and 112, and refers to a distance that determines an operating range of the monopulse algorithm of the disclosure. Hereinafter, radiating elements obtained by adding an $i^{th}$ radiating element group and an $i^{th}$ overlapping element are referred to as an '$i^{th}$ group'. For example, in the drawing, among five radiating elements 110 (n=1 to 5 and i=0 to 4) ('first group') in which the first radiating element group 81 and the first overlapping element 111 are combined, the radiating element corresponding to the center position may be determined as 81-2, that is, the third radiating element from the top, and among five radiating elements 110 (n=1 to 5 and i=3 to 7) ('second group') in which the second radiating element group 82 and the second overlapping element 112 are combined, the radiating element corresponding to the center position may be determined as 82-5, that is, the third radiating element from the bottom. Accordingly, the reference distance D is determined as a distance between the two radiating elements (i=2, i=5).

The reference distance D and an expanded beamwidth BE to be described later below are in inverse proportion to each other, and as the number of the overlapping elements 111 and 112 increases, the reference distance D becomes smaller and the expanded beamwidth $\theta_E$ becomes greater. If the number of radiating elements 110 included in the above-described first and second groups increases, for example, when n=1 to 7, the number of the overlapping elements 111 and 112 becomes six, and in this case, an reference distance D may be determined as a distance between the radiating elements 81-3 (i=3) and 82-4 (i=4), which is an interval between a center position of the first group and a center position of the second group.

In operation S330, after the calculating of the summation coefficients Y1 and Y2, a ratio value may be calculated using a sum and difference of the two summation coefficients Y1 and Y2. Operation S330 includes operations to be described later below.

First, a first arithmetic expression YΣ calculated as the sum of the first summation coefficient Y1 and the second summation coefficient Y2, and a second arithmetic expression YΔ calculated as the difference between the first summation coefficient Y1 and the second summation coefficient Y2 are calculated. The first equation YΣ and the second equation YΔ may be expressed as Equations 6 and 7 below.

$$Y\Sigma = Y2 + Y1 \qquad \text{[Equation 6]}$$

$$Y\Delta = Y2 - Y1 \qquad \text{[Equation 7]}$$

Thereafter, as shown in Equation 8 below, a ratio value K may be calculated as a ratio of the second arithmetic expression YΔ to the first arithmetic expression YΣ. That is, the ratio value K is a ratio between the sum and the difference of the two summation coefficients Y1 and Y2. '$\hat{\theta}$' in Equations 8 and 9 below may be an angle corresponding to the expanded beam width $\theta_E$ of the present specification.

$$K = \frac{Y\Delta}{Y\Sigma} = j\tan\left(\frac{kD}{2}\sin\hat{\theta}\right), k = \frac{2\pi}{\lambda} \qquad \text{[Equation 8]}$$

Thereafter, in operation S340, the expanded beamwidth may be obtained using a trigonometric function calculated based on the ratio value K. Operation S340 may include operation S341 of calculating a trigonometric function as in Equation 9 derived by Equation 8, and operation S342 of obtaining the expanded beamwidth $\hat{\theta}$ ($\theta_E$ in FIG. 8) based on Equation 9 below.

$$\sin\hat{\theta} = \frac{2\{\tan^{-1}(-jK)\}}{kD} \qquad \text{[Equation 9]}$$

Figure 9:
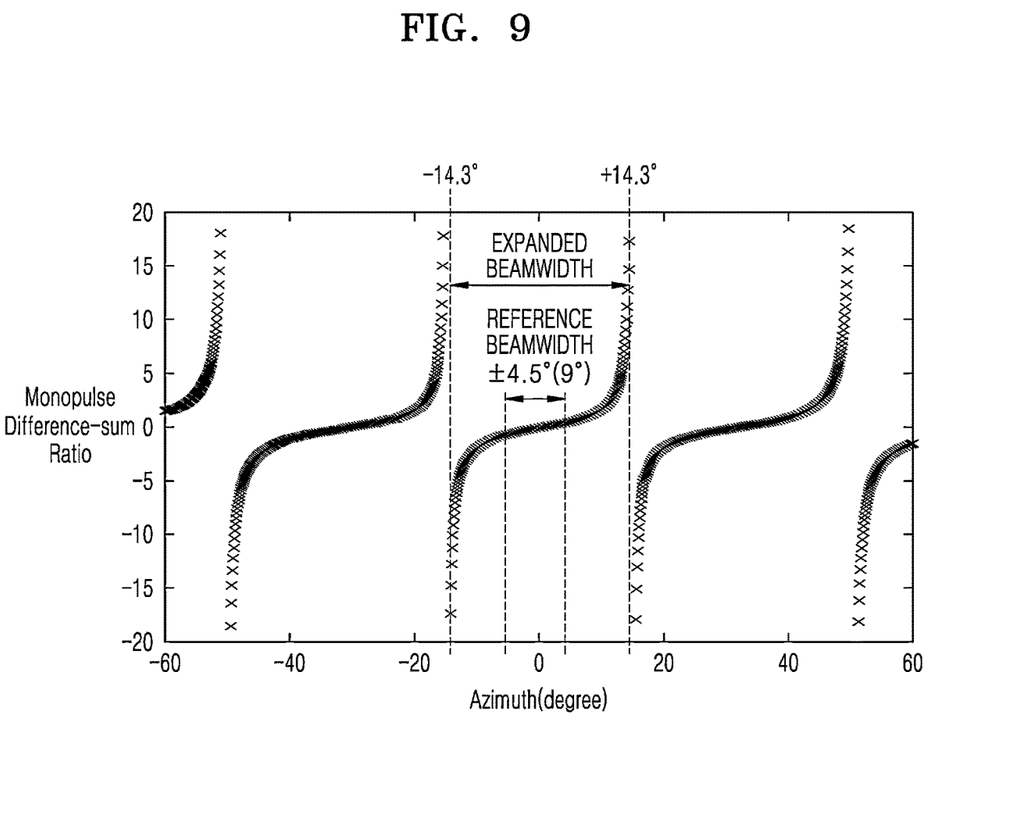
FIG. 9 is a graph illustrating a relationship between an expanded beamwidth, which is obtained by using a beam search method according to an embodiment, and a reference beamwidth.

FIG. 9 is a graph illustrating a relationship between an expanded beamwidth, which is obtained by using a beam search method according to an embodiment, and a reference beamwidth.

According to the beam search method to which the monopulse algorithm according to an embodiment is applied, by obtaining the expanded beamwidth $\theta_E$ (in FIG. 8) that is greater than the reference beamwidth $\theta_b$ (e.g., about 9°) determined by its physical structure as an effective beamwidth of the existing single tile 100, the range of an initial beam to be detected may be widened to improve the precision of omnidirectional beam search. In addition, even when the initial beam coefficient $\overline{w_0}$ is incorrectly determined, there is an advantage that beam search is possible if a received signal exists within the range of the expanded beamwidth $\theta_E$, that is, an estimation range of the monopulse algorithm.

Referring to FIG. 9, it can be seen that an expanded beamwidth of about 28.6 degrees (14.3×2), which is more expanded than the reference beamwidth of about 9 degrees, is obtained, and accordingly, a searchable range of the single tile 100 may also be expanded than the aforementioned 36 degrees (reference beam width×number of digital beams). According to an embodiment, when n single tiles 100 are arranged on one layer of the phased array antenna 10 as described above, in order to perform omnidirectional beam search using n single tiles 100, one single tile 100 needs to have a beam search range of 360/n (°) or more. At this time, using the monopulse algorithm according to an embodiment described above, it is possible to obtain the expanded beamwidth $\theta_E$ greater than 360/n (°).

The phased array antenna 10 of the disclosure may be a polygonal phased array antenna in which the plurality of single tiles 100 are arranged in a polygonal structure. In this case, the above-described content of the disclosure may be applied to each of the plurality of single tiles 100, and there is an advantage that beam search in a 360-degree direction is ultimately possible using the expanded beam width of each single tile 100.

When the disclosure is applied to a narrowband communication system using a frequency division method, the disclosure may be utilized even if the number of communication channels increases. In addition, because a beam search method using an active phased array antenna of the disclosure and a device therefor use only received signal strength, it is possible to simplify the system implementation.

The various embodiments described herein are illustrative, and do not need to be performed independently of each other. The embodiments described in this specification may be implemented in combination with each other.

The various embodiments described above may be implemented in the form of a computer program that can be executed by various components on a computer, and such a computer program may be recorded on a computer-readable medium. In this case, the medium may be to permanently store a computer executable program, or to temporarily store the program for execution or download. In addition, the medium may be various recording devices or storage devices in the form of single or multiple hardware combined, but is not limited to a medium directly connected to any computer system, and may exist distributed on a network. Examples of the medium may include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and those configured to store program instructions, including a read-only component (ROM), a random-access memory (RAM), a flash memory, and the like. In addition, examples of other media may include recording media or storage media managed by an app store that distributes applications, sites that supply or distribute other various software, and servers.

According to embodiments, it is possible to provide a beam search method using an active phased array antenna capable of precise omnidirectional beam search using a single tile-type phased array antenna capable of independent beam search, and a device therefor.

Although the preferred embodiments of the disclosure have been described above, the disclosure is not limited to the specific embodiments described above, and various modifications may be implemented by one of ordinary skill in the art without departing from the gist of the disclosure as claimed in the claims. In addition, these modifications should not be understood separately from the technical spirit or prospect of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A beam search method using an active phased array antenna, wherein the beam search method uses a single tile-type phased array antenna including a plurality of radiating elements arranged in a matrix form, and the phased array antenna comprises a plurality of sub-arrays including the plurality of radiating elements and arranged in one direction, comprises:
   calculating a beam coefficient application vector for each of the sub-arrays by using a received signal for each of the sub-arrays and a beam coefficient for each of the sub-arrays;
   determining, as an initial value, a beam coefficient of an effective sub-array corresponding to a maximum value from among absolute values of beam coefficient application vectors for each of the sub-arrays; and
   performing a monopulse algorithm based on the initial value, to obtain an expanded beamwidth greater than a reference beamwidth, which is a range of a beam detected by the phased array antenna,
   wherein the monopulse algorithm is performed on an effective sub-array corresponding to the initial value, and the performing of the monopulse algorithm to obtain the expanded beamwidth further comprises:
   determining a midpoint of the effective sub-array; and
   calculating a summation coefficient for radiating elements arranged on both sides of the midpoint,
   wherein the summation coefficient comprises: a first summation coefficient for a first radiating element group arranged on one side of the midpoint; and a second summation coefficient for a second radiating element group arranged on the other side of the midpoint, and
   the effective sub-array comprises an overlapping portion including overlapping elements used for both calculation of the first summation coefficient and calculation of the second summation coefficient.

2. The beam search method of claim 1, wherein the first summation coefficient is calculated by including a beam coefficient applied value of a first overlapping element that is at least a portion of the second radiating element group, and
   the second summation coefficient is calculated by including a beam coefficient applied value of a second overlapping element that is at least a portion of the first radiating element group.

3. The beam search method of claim 1, wherein the performing of the monopulse algorithm to obtain the expanded beamwidth further comprises:
   after the calculating of the summation coefficient,
   calculating a ratio value by using a sum and difference of the first summation coefficient and the second summation coefficient, and
   obtaining the expanded beamwidth using a trigonometric function calculated based on the ratio value.

4. The beam search method of claim 3, wherein the calculating of the ratio value comprises:
   calculating a first arithmetic expression calculated as the sum of the first summation coefficient and the second summation coefficient, and a second arithmetic expression calculated as the difference between the first summation coefficient and the second summation coefficient; and
   calculating the ratio value as a ratio of the second arithmetic expression to the first arithmetic expression.

5. The beam search method of claim 1, wherein, when the effective sub-array has a reference distance in a direction in which the radiating elements are arranged in the effective sub-array,
   as the number of the overlapping elements increases, the reference distance decreases.

6. The beam search method of claim 5, wherein the reference distance and the expanded beamwidth are in inverse proportion to each other.

7. The beam search method of claim 1, wherein the phased array antenna is a polygonal phased array antenna in which a plurality of single tiles are arranged in a polygonal structure, and
   the phased array antenna is able to search a 360-degree beam by using an expanded beamwidth of each of the plurality of single tiles.

8. A non-transitory computer-readable medium storing a computer program including instructions that, when executed by a processor, causes a computer to execute the method of claim 1.

9. A beam search device using an active phased array antenna, the beam search device using a single tile-type phased array antenna including a plurality of radiating elements arranged in a matrix form, wherein the phased array antenna comprises a plurality of sub-arrays including the plurality of radiating elements and arranged in one direction, the beam search device comprising:
a controller,
wherein the controller calculates a beam coefficient application vector for each of the sub-arrays by using a received signal for each of the sub-arrays and a beam coefficient for each of the sub-arrays,
determines, as an initial value, a beam coefficient of an effective sub-array corresponding to a maximum value from among absolute values of beam coefficient application vectors for each of the sub-arrays, and
performs a monopulse algorithm based on the initial value, to obtain an expanded beamwidth greater than a reference beamwidth, which is a range of a beam detected by the phased array antenna,
wherein the controller performs the monopulse algorithm on an effective sub-array corresponding to the initial value, and in performing the monopulse algorithm,
determines a midpoint of the effective sub-array, and
calculates a summation coefficient for radiating elements arranged on both sides of the midpoint,
wherein the summation coefficient comprises: a first summation coefficient for a first radiating element group arranged on one side of the midpoint and a second summation coefficient for a second radiating element group arranged on the other side of the midpoint, and
the effective sub-array comprises an overlapping portion including overlapping elements used for both calculation of the first summation coefficient and calculation of the second summation coefficient.

10. The beam search device using an active phased array antenna of claim 9, wherein the first summation coefficient is calculated by including a beam coefficient applied value of a first overlapping element that is at least a portion of the second radiating element group, and
the second summation coefficient is calculated by including a beam coefficient applied value of a second overlapping element that is at least a portion of the first radiating element group.

11. The beam search device using an active phased array antenna of claim 9, wherein the controller, after the calculating of the summation coefficient,
calculates a ratio value using a sum and difference of the first summation coefficient and the second sum coefficient, and
obtains the expanded beamwidth by using a trigonometric function calculated based on the ratio value.

12. The beam search device using an active phased array antenna of claim 11, wherein the controller, when calculating the ratio value,
calculates a first arithmetic expression calculated as the sum of the first summation coefficient and the second summation coefficient, and a second arithmetic expression calculated as the difference between the first summation coefficient and the second summation coefficient, and
calculates the ratio value as a ratio of the second arithmetic expression to the first arithmetic expression.

13. The beam search device using an active phased array antenna of claim 9, wherein, when the effective sub-array has a reference distance in a direction in which the radiating elements are arranged in the effective sub-array,
as the number of the overlapping elements increases, the reference distance decreases.

14. The beam search device using an active phased array antenna of claim 13, wherein the reference distance and the expanded beamwidth are in inverse proportion to each other.

15. The beam search device using an active phased array antenna of claim 9, wherein the phased array antenna is a polygonal phased array antenna in which a plurality of single tiles are arranged in a polygonal structure, and
the phased array antenna is able to search a 360-degree beam by using an expanded beamwidth of each of the plurality of single tiles.

\* \* \* \* \*